United States Patent [19]

Becker

[11] 3,870,666

[45] Mar. 11, 1975

[54] CURING AGENT FOR AQUEOUS EPOXIDE RESIN DISPERSIONS

[75] Inventor: Wilhelm Becker, Hamburg, Germany

[73] Assignee: Reichhold-Albert Chemie Aktiengesellschaft, Hamburg, Germany

[22] Filed: July 18, 1973

[21] Appl. No.: 380,343

[30] Foreign Application Priority Data
July 25, 1972  Switzerland...................... 11106/72

[52] U.S. Cl............ 260/21, 260/18 EP, 260/18 PN, 260/19 EP, 260/28, 28/51.5, 260/78.4 EP
[51] Int. Cl............................................ C08g 45/10
[58] Field of Search........... 260/51.5, 18 EP, 28, 21, 260/19 EP, 18 PN, 78.4 EP

[56] References Cited
UNITED STATES PATENTS

| | | | |
|---|---|---|---|
| 3,186,969 | 6/1965 | Cox et al. .......................... | 260/51.5 |
| 3,382,261 | 5/1968 | Kittredge et al...................... | 260/18 |
| 3,383,347 | 5/1968 | Pettit ..................................... | 260/28 |
| 3,449,278 | 6/1969 | McKay et al. ........................ | 260/18 |
| 3,474,056 | 10/1969 | Schneider et al..................... | 260/21 |
| 3,607,803 | 9/1971 | Toepfl et al. ......................... | 260/21 |
| 3,647,728 | 3/1972 | Deflorin et al........................ | 260/18 |
| 3,649,575 | 3/1972 | Toepfl et al. ......................... | 260/21 |

FOREIGN PATENTS OR APPLICATIONS 789,475   1/1958   Great Britain..................... 260/51.5

*Primary Examiner*—Eugene C. Rzucidlo
*Attorney, Agent, or Firm*—Gordon W. Hueschen

[57] ABSTRACT

Object of the present invention are curing agents for aqueous epoxide resin dispersions, which are association compounds formed of polyamidoamine-epoxide adducts and of a phenol-formaldehyde-polyamine condensation product.

10 Claims, No Drawings

CURING AGENT FOR AQUEOUS EPOXIDE RESIN DISPERSIONS

BACKGROUND OF THE INVENTION

1. FIELD OF THE INVENTION

It is an object of the present invention to make available a curing agent for aqueous epoxide resin dispersions, which yields resistant protective coatings in conjunction with aqueous epoxide resin dispersions.

It is known that polyamidoamines which contain free amino groups and which are manufactured from Alkylenepolyamines and polymerised unsaturated, natural fatty acids, can be used for curing epoxide resins (Compare "Epoxidverbindungen und Epoxidharze" of Dr. Alfred Paquin, Springer-Verlag Berlin, Göttingen, Heidelberg, 1958, pages 511-516 and Lee & Neville "Handbook of Epoxy Resins," Mc Graw-Hill Book Company, New York, 1967, chapter 10.1-10.12).

The curing of epoxide resins with adducts which are formed from polyamidoamines and polyepoxides in absence of water is also known by U.S. Pat. No. 3,280,054. Whilst it has been proposed by German Published specification 1,520,918 to manufacture curable aqueous dispersions of these adducts and epoxide resins, the results thereby obtained are frequently not satisfactory as has been found out by our tests. Thus, in some cases the adducts, especially those manufactured from aromatic polyepoxides, are semi-solid and cannot be completely dispersed in an aqueous medium, whilst aqueous dispersions which contain an aromatic epoxide resin and an adduct manufactured from an aliphatic polyepoxide, frequently possess an undesirable thixotropic behaviour.

U.S.A. Pat. No. 3,383,347 describes the use of phenol-modified amines, which can be reaction products of one primary amino group of an aliphatic polyamine with a phenol or reacion products of an aliphatic polyamine with a phenol and an aldehyde, as curing agents. However, these curing agents give epoxide resin-curing agent emulsions of inadequate pot life, which lead to very brittle coatings and which furthermore show undesirable rust-brown discolourations in the presence of iron.

German Published specification 1,925,941 describes epoxide resin-Curing agent emulsions which contain, as the curing agent component, an aminoamide adduct which is an aminoamide of a fatty acid and of an alkylenepolyamine and which is the reaction product of the aminoamide with 10-40 percent by weight (per cent by weight, relative to the weight of the aminoamide adduct constituents of low volatility) of a monoepoxide which consists of an aliphatic monoepoxide with 2-12 carbon atoms or of a monoepoxide substituted by a phenyl radical.

These epoxide resin-curing agent emulsions display relatively great instability and water separates out even during the pot life. The coatings manufactured with these emulsions remain relatively soft and very sensitive to mechanical influences, so that they cannot be used to produce sufficiently stable protective coatings.

Swiss Patent specification 487,955 describes curable aqueous dispersions which contain a curing agent for the epoxide resin, the curing agent being liquid at room temperature, with hydrogen directly bonded to nitrogen, and being obtainable by addition of non-aliphatic epoxide which only contains one terminal 1,2-epoxide group per molecule, or aliphatic epoxide which on average contains one or more than one terminal 1,2-epoxide group per molecule, and a stoichoimetric excess of a poly(aminoamide) condensation product which is obtainable from an alkylenepolyamine of the formula $$H_2N-(-Alkylene-NH-)_n-H$$

wherein the alkylene is of ethylene, propylene, butylene, pentylene or hexylene, n denotes an integer greater than zero, and a copolymer of a conjugated unsaturated fatty acid or of an amide-forming acid derivative with an aromatic vinyl compound. The aqueous dispersions furthermore preferably contain a curing accelerator. These accelerators are compounds which contain at least one tertiary amino nitrogen atom and a phenolic hydroxyl group. Furthermore, the dispersions contain orthophosphoric acid or a liquid aliphatic monocarboxylic acid, for example acetic acid. These epoxide resin-curing agent dispersions again are still inadequately stable and only give relatively soft anad mechanically sensitive protective coatings. Furthermore, the presence of the dissociating acids leads to an instability of the dispersion, since the acid anion ($A^-$) can react with the epoxide group according to the following equation, thereby consuming epoxide groups:

$$R.CH-CH_2 + A^- + H_2O \longrightarrow R.CH(OH).CH_2A + OH^-.$$

It is an object of the present invention to make available a curing agent for aqueous epoxide resin dispersions which does not suffer from the disadvantages mentioned and, surprisingly, yields resistant protective coatings in conjunction with aqueous epoxide resin dispersions.

SUMMARY

Object of the present invention are curing agents for aqueous epoxide resin dispersions characterised in that they are association compounds formed of (1.) polyamidoamine — epoxide adducts (1) of a stoichiometric excess of a polyamido amine (1a) obtained from a polyalkylene polyamine (wherein the alkylene radical is ethylene, propylene, butylene, pentylene or hexylene) and mono-, di- and/or trimerised fatty acids or a copolymer of conjugated unsaturated fatty acids or amide forming acid derivatives thereof (wherein the fatty acids or fatty acid derivatives contain 8-24 carbon atoms in the monomeric form) with an aromatic vinyl compound, and 5 to 35 percent by weight, relative to the polyamidoamine employed, of an alikphatic epoxide compound (1b) with more than two terminal epoxide groups, however not more than 6, and (2.) 5 to 30 percent by weight, relative to the polyamidoamine employed, of a phenol-formaldehyde-polyamine condensation product (2) (wherein the aliphatic, araliphatic, cycloaliphatic or heterocyclic polyamine contains at least 2, however not more than 8 hydrogen atoms directly bonded to nitrogen).

A further object of the invention is a method for the production of an association compound characterized in that these are produced from polyamidoamine-epoxide adducts (I) by reaction with phenol-formaldehydepolyamine condensation products (2).

In a preferred embodiment the reaction is carried out by heating at 50° to 180° C.

For this reaction (1 and 2; or 1a with 1b stepwise to 1 in the first step and in the second step with 1 and 2 to form the association compound (1.) polyamidoamine-epoxide adducts (1 or mixtures of 1a and 1b) of an stoichiometric excess of a polyamidoamine (1a) obtained from a polyalkylene polyamine (wherein the alkylene radical is ethylene, propylene, butylene, pentylene or hexylene) and mono-, di- and/or trimerised fatty acids or a copolymer of conjugated unsaturated fatty acids or amideforming acid derivatives thereof (wherein the fatty acids or fatty acid derivatives contain 8–24 carbon atoms in the monomeric form) with an aromatic vinyl compound, and 5 to 35 percent by weight, relative to the polyamidoamine employed, of an aliphatic epoxide compound (1b) with more than two terminal epoxide groups, however not more than 6, and (2.) 5 to 30 percent by weight, relative to the polyamidoamine employed, of a phenol-formaldehyde-polyamine condensation product (2) (wherein the aliphatic, araliphatic, cycloaliphatic or heterocyclic polyamine contains at least 2, however no more than 8 hydrogen atoms directly bonded to nitrogen) are warmed.

The formation of the association compound manifests itself through a rise in viscosity whilst heating the components (1.) and (2.) over a longer period at below 50°C or at 50° to 180°C, preferably 100° to 150°C, and this rise can amount of 10–50 percent, measured at 25°C in centipoise.

A further object of the invention is the use of the association compound, obtained according to the above mentioned method, together with epoxy resins as well as emulsifiers and water, whereby optionally water-dilutable organic solvents can be employed additionally for the manufacture of curable dispersions as coating agents which may optionally also have filmforming properties.

The polyamidoamine (1a) which is used to form the polyamidoamine-epoxide adduct is derived from an alkylenepolyamine and a polymeric aliphatic fatty acid which is obtained by cationic copolymerisation of a conjugated fatty acid of 18 carbon atoms in the chain or of the methyl, ethyl, propyl or butylester thereof, with styrene in a molar ratio of between 1 : 0,2 and 1 : 5. The copolymerisation is carried out in the presence of compounds accelerating the cationic copolymerisation and optionally in the presence of compounds hindering the radical copolymerisation, at higher temperature over several hours, preferably 6 hours.

Such polyamidoamines (1a) are described in British Patent specification 988,738. The polyamidoamines (1a) with an amine number between 80 and 450 are particularly preferred.

Other polyamidoamines (1a) which are appropriately used for the manufacture of the polyamidoamineepoxide adduct (1) can mainly be prepared by reaction of polymeric fatty acids with an alkylenepolyamine. The reaction conditions for the manufacture of the polyamidoamine component (1a) can be varied extensively. Normally, the reaction is carried out at a temperature of 100°–325° C, preferably 150°–315° C.

The reaction time can be varied within wide limits and depends somewhat on the reaction temperatures; normally, it is 2–8 hours from reaching the desired temperature.

The polymeric fatty acids which can be used for the manufacture of these polyamidoamines (1a) are those which are obtained by polymerisation of drying or semi-drying oils or of the free fatty acids or of the esters of these fatty acids with simple alcohols. The term "fatty acids" is intended to include saturated, ethylenically unsaturated and acetylenically unsaturated, naturally occurring and synthetic monobasic aliphatic acids in the monomeric form with 8–24 carbon atoms. The term "polymeric fatty acid" relates to polymerised fatty acids produced thereof.

The saturated, ethylenically unsaturated and acetylenically unsaturated fatty acids can generally be polymerised by processes, differing in some respects, but because of the functional similarity of the polymerisation products, they are all generally referred to as "polymeric fatty acids."

The ethylenically unsaturated fatty acids can be polymerised easily. Catalytic or non-catalytic polymerisation processes can be used for this purpose. The non-catalytic polymerisation in general requires a higher temperature. Suitable catalysts for the polymerisation include acid or alkaline clays, di-t-butyl peroxide, boron triflouride and other Lewis acids, anthraquinone, sulphur dioxide and the like. Suitable monomers are the branched and straight chain, polyethylenically and monoethylenically unsaturated acids, such as, for example, 3-octenoic acid, 11-dodecenoic acid, lauroleic acid, myristoleic acid, palmitoleic acid, pentroselinic acid, oleic acid, elaidic acid, cetoleic acid, linoleic acid, linolenic acid and elaeostearic acid.

Because of their easy accessibility and their relatively easy polymerisability, oleic acid and linoleic acid are the preferred starting materials for the manufacture of the polymeric fatty acids. Mixtures of oleic acid and linoleic acid are preferably used. They are obtained from tall oil fatty acids rather cheaply.

A typical composition of commercially obtainable polymeric fatty acids from tall oil, based on unsaturated fatty acids with 18 C atoms, is, for example: 5–15 per cent by weight of monobasic fatty acids with 18 C atoms, 60–80 per cent by weight of dibasic fatty acids with 36 C atoms and 10–35 per cent by weight of tribasic and more highly basic fatty acids with 54 or more C atoms.

These mixtures can be fractionated from monomeric and polymeric fatty acids in a suitable manner such as, for example, by high vacuum distillation or by solvent extraction processes, so that, if required, fractions with higher concentrations of dimeric fatty acids can be obtained. For the purposes of the polyamidoamines (1a) used according to the invention, the content of monomeric fatty acids can vary over a rather broad range; it can be low, say 1–5 percent by weight, or high, say 15–20 percent by weight.

The alkylenepolyamines which can be used for the manufacture of the polyamidoamines have the general formula

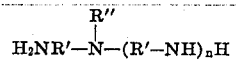

wherein R' denotes an alkylene radical with 2–6 C atoms, R'' denotes hydrogen or R'NH₂ and n denotes an integer from 0 to 3. The alkylenepolyamines in the reaction mixtures can be used by themselves or as mixtures but the content of ethylenediamine or propylenediamine of any such mixture should amount to at least half the polyalkylenepolyamines used; preferably, the content of ethylendiamine or propylenediamine should account for three-quarters of the amino groups present. The polyamidoamines (1a) used according to the invention are preferably manufactured with an excess of amino groups over the carboxyl groups, so that the amine number of the polyamidoamine (1a) is between 80 and 450.

The term "amine number" is defined as the amount of potassium hydroxide in mg which is equivalent to the alkalinity produced by the amino groups in 1 g of the substance. The process for the determination of the amine number is indicated in General Mills Bulletin VIII-H-2a, October 1965.

Examples of possible alkylene polyamines are: ethylenediamine, diethylenetriamine, triethylenetetramine, tetraethylenepentamine, tris-aminoethylamine, propylenediamine, dipropylenetriamine, tripropylenetetramine and tetraethylenepentamine.

The polyamidoamines (1a) obtainable from the abovementioned reactants can furthermore also contain imidazoline groups.

The ratio of polymeric fatty acids to polyamines which can be used for the production of the polyamidoamines (1a) is preferably between 0.5 and 1.5 mols of alkylenepolyamine per equivalent of carboxyl groups of the polymeric acid.

Three typical polyamidoamines (1a) which are used for the manufacture of the curing agents according to the invention are described below:

polyamidoamine 1 (component 1a):

A copolymer manufactured by ionic polymerisation, from 2 mols of isomerised soya oil fatty acid methyl ester and one mol of styrene, which mainly consists of the dimeric ester and has a saponification number of 190, was reacted with diethylenetriamine by heating to 190° C, to give a polyamidoamine (1a) with the following characteristic data:

| | |
|---|---|
| Viscosity at 25° C | : 1,950 cP |
| Amine number | : 278 |
| Amine hydrogen equivalent weight | : 110 |

Polyamidoaamine 2 (component 1a):

A dimeric fatty acid manufactured by thermal polymerisation from isomerised tall oil fatty acids and having an acid number of 190 was reacted with diethylenetriamine, by heating to 190° C, to give a polyamidoamine having the following characteristic data:

| | |
|---|---|
| Viscosity at 25° C | : 650 cP |
| Amine number | : 350 |
| Amine hydrogen equivalent weight | : 100 |

Polyamidoamine 3 (component 1a):

A copolymer made from 2 mols isomerised soya oil fatty acid methylester and 1 mol styrene by ionic polymerization, which consists mainly of a dimeric ester and which has a saponification number of 190, was reacted with triethylenetetramine in a molar ratio of 1: 2.6 by heating to 190°C to give a polyamidoamine of the following characteristic data:

| | |
|---|---|
| Viscosity at 25° C | : 246 cP |
| Amine number | : 425 |
| Amine hydrogen equivalent weight | : 95 |

The amount of aliphatic epoxide component (1b) of more than 2 but not more than 6 terminal epoxy groups, which is needed for the formation of the polyamidoamine-epoxide-adduct (1), such as the aliphatic polyolglycidylether, can be manufactured according to the methods published in U.S. Pat. No. 2,581,464 and British Pat. No. 780,288. B 35750/IV b/120 (now West German Patent No. 960,185). These compounds have the following properties:

1. Trimethylolpropane-glycidyl-ether
   | | |
   |---|---|
   | Epoxide equivalent | : 150 |
   | Viscosity at 25° C | : 170 cP |
   | Total chlorine content | : 7.4 % by weight |
   | Hydrolyzable chlorine | : 0.13 % by weight |
2. Glycerine-glycidyl-ether
   | | |
   |---|---|
   | Epoxide equivalent | : 164 |
   | Viscosity at 25° C | : 182 cP |
   | Total chlorine content | : 12.6 % by weight |
   | Hydrolyzable chlorine | : 0.79 % by weight |
3. Pentaerythritol-glycidyl-ether
   | | |
   |---|---|
   | Epoxide equivalent | : 148 |
   | Viscosity at 25° C | : 565 cP |
   | Total chlorine content | : 13.1 % by weight |
   | hydrolyzable chlorine | : 0.59 % by weight |
4. Glycidyl ether of an oxypropylated pentaerythritol (molecular weight 600, hydroxyl number 561)
   | | |
   |---|---|
   | Epoxide equivalent | : 267 |
   | Viscosity at 25° C | : 257 cP |
   | Total chlorine content | : 3.97 % by weight |
   | hydrolyzable chlorine | : 0.77 % by weight |
5. Sorbitol-glycidyl-ether
   | | |
   |---|---|
   | Epoxide equivalent | : 237 |
   | Viscosity at 25° C | : 251 cP |
   | Total chlorine content | : 11.5 % by weight |
   | hydrolyzable chlorine | : 0.6 % by weight |
6. Glycidyl ether of an oxypropylated sorbitol (molecular weight: 760, hydroxyl number: 481)
   | | |
   |---|---|
   | epoxide equivalent | : 246 |
   | Viscosity at 25° C | : 990 cP |
   | Total chlorine content | : 4.25 % by weight |
   | hydrolyzable chlorine | : 0.35 % by weight |

To manufacture the adducts (1), the reaction between the polyamidoamines (1a) and the polyolglycidyl-ethers (1b) is carried out in a suitable manner in the liquid phase, the polyol-glycidyl-ethers being added to the polyamidoamines, with application of heat at a temperature of 20°–150°C.

In the embodiments, the amount of the polyolglycidylether (1b) used for adduct (1) formation is 7 to 25 percent by weight, relative to the polyamidoamine (1a) employed. The condensation products of phenol, formaldehyde and polyamaines used as component 2 can be manufactured according to the processes disclosed in German Displayed specification 1,162,076, British Patent specification 1,163,502 or German Offenlegungsschrift 2,025,343. The manufacture of two phenol-formaldehyde-polyamine condensation products (2) are described below:

Condensation Product 1 (component 2):

188 g of phenol (2 mols) were fused and 96 g of 44 percent strength by weight aqueous formaldehyde solution were added over the course of 15 minutes at approx. 45°C. Thereafter, 272 g of xylylenediamine (2 mols) were added at the same temperature over the course of 30–45 minutes. Water was distilled off into a receiver under a vacuum of approx. 15 mm Hg, whilst simultaneously heating to 105°C. Thereafter the condensation product was left for approx. 30 minutes under a full vacuum at 105°C until a Gardner-Holdt viscosity of $Z_1$–$Z_2$ was reached.

A condensation product 1 having the following characteristic data was obtained:

Viscosity at 25° C : 2,500 cP
Amine number : 490
Amine hydrogen equivalent weight : 73

The condensation product mainly consists of a compound of the following formula:

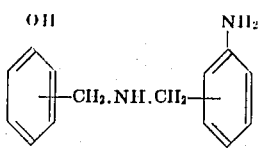

In the same manner, equivalent amounts of the following diamines can be reacted in place of xylylenediamine:

a) bis-(aminomethyl)-cyclohexane,
b) menthanediamine,
c) isophoronediamine (= 1-amino-3-aminomethyl-3,5,5-trimethylcyclohexane),
d) 2,2,4-(2,4,4-)-trimethylhexamethylenediamine,
e) hexamethylenediamine and
f) N-aminoethylpiperazine.

The condensation products 2, which are made of polyamines a)-f) have the following overall formulas:

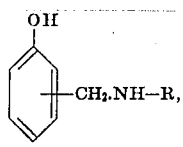

wherein R means the following radicals

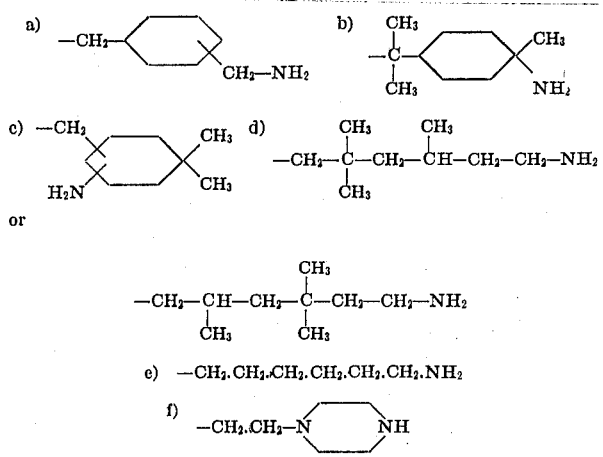

Condensation Product 2 (component 2):

297 g of 44 percent strength by weight aqueous formaldehyde solution (4.35 mols) were added to 960 g of triethylenetetramine (6.15 mols) over the course of 15-20 minutes at 40°C, whilst cooling. Thereafter, 579 g of fused phenol (6.15 mols) were added over the course of 15 minutes at the same temperature. Water was distilled off into a receiver under a vacuum of approx. 15 mm Hg whilst simultaneously heating to 80°C. At 80°C the condensation product was left under full vacuum for approx. 30 minutes until a Gardner-Holdt viscosity of T-U was reached.

A condensation product 2 having the following characteristic data was obtained:

Viscosity at 25° C : 885 cP
Amine number : 644
Amine hydrogen equivalent weight : 53

The condensation product 2 consists mainly of a compound of the following formula:

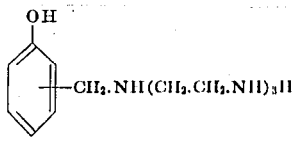

In the same manner, equivalent amounts of the following polyamines can be reacted to give component 2 in place of triethylenetetramine:
a') diethylenetriamine, b') dipropylenetriamine, c') tripropylenetetramine, d') tetraethylenepentamine and e') tetrapropylenepentamine.

In manufacturing these condensation products, the aqueous formaldehyde solution can be replaced by paraformaldehyde, acetaldehyde, propionaldehyde or isobutyraldehyde. The component 2 made from polyamines a') to e') have the following overall formula:

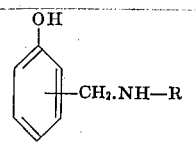

wherein R means the following radicals:

a') —(CH$_2$.CH$_2$.NH)$_2$H    b') —(CH$_2$.CH$_2$.CH$_2$.NH)$_2$H
c') —(CH$_2$.CH$_2$.CH$_2$.NH$_2$)$_3$H    d') —(CH$_2$.CH$_2$.NH)$_4$H
e') —(CH$_2$.CH$_2$.CH$_2$.NH)$_4$H

The manufacture of the association compound, the nature of which was not investigated in more detail, is carried out by heating the components (1) and (2) at 50°-180°C, preferably 100° to 150°C, for a period of 1 to 3 hours or by leaving the mix at a temperature below 50°C for a longer period.

This produces a viscosity increase of 10 to 50 percent, which suggests a reaction taking place between the components 1 and 2.

To reduce the viscosity, the association compounds can be dissolved in inert solvents which are compatible with water or can be diluted with water, or can be manufactured in such solvents. Suitable inert solvents are, for example, ethanol, i-propanol, methylglycol and ethylglycol. The viscosity of the association compounds according to the invention, which may be present in solution, is 500 to 15,000, preferably 1,000 to 10,000, cP, measured at 25°C.

The following examples explain the association Compounds and their manufacture in more detail.

EXAMPLE 1

183 g of polyamidoamine 1 (component 1a) were warmed to 120° C under a N$_2$ atmosphere. At this temperature, 26.3 g of trimethylolpropane-glycidyl-ether (component 1b) were added uniformly over the course of 3 hours. The polyamidoamine-epoxide adduct (1) was diluted with 60 g of ethylene ethylene glycolmonoethylether, 26.5 g of the phenolformaldehydepolyamine condensation product 1 of phenol, formaldehyde and xylylenediamine were added at a temperature of approx. 80°C. The mixture was stirred for 2 hours at a temperature of 100°C. An association compound, which is a curing agent having the following characteristic data, was obtained:

| | |
|---|---|
| Viscosity at 25° C | : 3,500 cP |
| Amine number | : 225 |
| Solids content | : 80% by weight |
| Amine hydrogen equivalent | : 155 |

EXAMPLE 2

The procedure followed was analogous to example 1 but the following amounts were reacted: 183 g of polyamidoamine 2 (component 1a), 38.4 g of trimethylolpropane-glycidylether (component 1b), 63 g of ethyleneglycolmonoethylether and 27.6 g of the condensation product 1 (component 2) of phenol, formaldehyde and xylylenediamine. An association compound, which may be used as a curing agent having the following characteristic data was produced:

| | |
|---|---|
| Viscosity at 25° C | : 3,100 cP |
| Amine number | : 301 |
| Solids content | : 80% by weight. |
| Amine hydrogen equivalent | : 155 |

EXAMPLE 3

The procedure followed was analogous to Example 1, but instead of trimethylolpropane-glycidyl-ether (1) the same amount of the glycidyl ether of propoxylated pentaerythritol (4) was employed.

An association compound, which may be used as curing agent having the following characteristic data was produced:

| | |
|---|---|
| Viscosity at 25° C | : 1,240 cP |
| Amine number | : 210 |
| Solids content | : 79% by weight |
| Amine hydrogen equivalent | : 152 |

EXAMPLE 4

The procedure followed was analogous to Example 1. The following amounts were reacted: 183 g of polyamidoamine (1) (as component 1a), 20 g of pentaerythritol-glycidyl-ether (3) (as component 1b), 57 g of ethyleneglycolmonoethylether and 25.5 g of condensation product 1 of phenol, formaldehyde and xylylenediamine (as component 2). An association compound, which can be used as a curing agent having the following characteristic data was produced:

| | |
|---|---|
| Viscosity at 25°C | : 10,700 cP |
| Amine number | : 206 |
| Solids content | : 79.5% by weight |
| Amine hydrogen equivalent | : 150 |

EXAMPLE 5

The procedure followed was analogous to Example 1. The following amounts were reacted: 183 g of polyamidoamine (1) (as component 1a), 13 g of sorbitol-glycidyl-ether (5) (as component 1b), 50 g of ethyleneglycolmonoethylether and 25.5 g of condensation product 1 of phenol, formaldehyde and xylylenediamine (as component 2). An association compound, which can be used as a curing agent having the following characteristic data was produced:

| | |
|---|---|
| Viscosity at 25° C | : 1,486 cP |
| Amine number | : 226 |
| Solids content | : 80.5 % by weight |
| Amine hydrogen quivalent | : 137 |

EXAMPLE 6

The procedure followed was analogous to Example 1. Instead of trimethylolpropane-glycidyl-ether (1), the same amount of the glycidyl ether of propoxylated sorbitol (6) (as component 1b) was employed. An association compound, which can be used as a curing agent having the following characteristic data was produced:

| | |
|---|---|
| Viscosity at 25° C | : 2,188 cP |
| Amine number | : 214 |
| Solids content | : 79.5 % by weight |
| Amine hydrogen equivalent | : 153. |

EXAMPLE 7

The procedure followed was analogous to Example 1. Instead of trimethylolpropane-glycidyl-ether (1) the same amount of glycerine-glycidyl-ether (2) (as component 1b) was employed. An association conpound, which may be used as a curing agent having the following characteristic data was produced:

| | |
|---|---|
| Viscosity at 25° C | : 4,120 cP |
| Amine number | : 212 |
| Solids content | : 81% by weight |
| Amine hydrogen equivalent | : 158. |

EXAMPLE 8

The procedure followed was analogous to Example 3. Instead of the condensation product 1 (as component 2) of phenol, formaldehyde and xylylenediamine as component 2, the same amount of condensation product 2 of phenol, formaldehyde and triethylenetetramine was employed. An association compound usable as curing agent having the following characteristic data was produced:

| | |
|---|---|
| Viscosity at 25° C | : 1,000 cP |
| Amine number | : 260 |
| Solids content | : 77% by weight |
| Amine hydrogen equivalent | : 143. |

EXAMPLE 9

The procedure followed was analogous to Example 6. Instead of the condensation product 1 (as component 2) of phenol, formaldehyde and xylylenediamine as component 2, the same amount of condensation product 2 of phenol, formaldehyde and triethylenetetramine was employed. An association compound usable as a curing agent having the following characteristic data was produced:

| | |
|---|---|
| Viscosity at 25° C | : 1,660 cP |
| Amine number | : 252 |
| Solids content | : 78 % by weight |
| Amine hydrogen equivalent | : 144. |

EXAMPLE 10

The procedure followed was analogous to Example 4. Instead of the condensation product 1 (as component 2) of phenol, formaldehyde and xylylenediamine, the same amount of condensation product 2 of phenol, formaldehyde and triethylenetetramine was employed. An association compound usable as a curing agent having the following characteristic data was produced:

| | |
|---|---|
| Viscosity at 25° C | : 3,980 cP |
| Amine number | : 248 |
| Solids content | : 79 % by weight |
| Amine hydrogen equivalent | : 141. |

EXAMPLE 11

The procedure followed was analogous to Example 7. Instead of the condensation product 1 (as component 2) of phenol, formaldehyde and xylylenediamine as component 2, the same amount of condensation product 2 of phenol, formaldehyde and triethylenetetramine was employed. An association compound usable as a curing agent having the following characteristic data was produced:

| | |
|---|---|
| Viscosity at 25° C | : 3,940 cP |
| Amine number | : 247 |
| Solids content | : 80 % by weight |
| Amine hydrogen equivalent | : 148. |

EXAMPLE 12

The procedure followed was analogous to Example 5. Instead of the condensation product 1 (as component 2) of phenol, formaldehyde and xylylenediamine (as component 2), the same amount of condensation product 2 of phenol, formaldehyde and triethylenetetramine was employed. An association compound, usable as a curing agent having the following characteristic data was produced:

| | |
|---|---|
| Viscosity at 25° C | : 1,765 cP |
| Amine number | : 273 |
| Solids content | : 80 % by weight |
| Amine hydrogen equivalent | : 129. |

EXAMPLE 13

The procedure followed was analogous to Example 1. Instead of the condensation product 1 (as component 2) of phenol, formaldehyde and xylylenediamine (as component 2); the same amount of condensation product 2 of phenol, formaldehyde and triethylenetetramine was employed. An association compound usable as a curing agent having the following characteristic data was produced:

| | |
|---|---|
| Viscosity at 25° C | : 3,240 cP |
| Amine number | : 248 |
| Solids content | : 80 % by weight |
| Amine hydrogen equivalent | : 148. |

EXAMPLE 14

366 g of polyamidoamine 3 (component 1a) were warmed to 120° C under nitrogen gas. At this temperature 53 g of trimethylolpropaneglycidylether (1) (component 1b) were added continuously over the course of 3 hours. Thereafter the mix was cooled to 100° C and 53 g of condensation product 1 (as component 2) of phenol, formaldehyde and xylylenediamine were added to the adduct (1). This reaction mix was stirred another 2 hours at a temperature of 100° C. The association compound this obtained, which may be used as curing agent has the following characteristic data:

| | |
|---|---|
| Viscosity at 25° C | :15,600 cP |
| Amine number | : 372 |
| Density at 25° C | : 1.00 |
| Amine hydrogen equivalent | : 111. |

This curing agent free of solvents may also be emloyed in the corresponding manner to those association compounds 1 to 13 for curing aqueous epoxy resin dispersions. The association compounds of adducts of polyamidoamine (1) (as component 1a) and trimethylolpropaneglycidylether (1) (as component 1b) and condensation product 1 (as component 2) of phenol, formaldehyde and xylylenediamine are the preferred embodiments.

These preferred embodiments are demonstrated by Examples 1, 2 and 14.

The curing agent according to the invention, dissolved in organic solvents which can be diluted with water, is mixed with epoxide resins which are in the form of aqueous dispersions, and the mixture is directly converted to coatings. The potlife for this is about 1 to 10 hours. It is however also possible to mix epoxides and the adducts manufactured according to the invention, optionally with the use of organic solvents which an be diluted with water, and then to convert the mixture into a dispersion with water, optionally with the use of emulsifiers.

Amongst the large number of epoxide compounds which contain more than one 1,2-epoxide group in the molecule and which can be reacted, according to the invention, with the association compound of the invention as curing agents to give coatings, there may be mentioned: the epoxides of poly-unsaturated hydrocarbons (vinylcyclohexene, dicyclopentadiene, cyclohexadiene, cyclododecadiene, cyclododecatriene, isoprene, 1,5-hexadiene, butadiene, polybutadienes, divinylbenzenes and the like), oligomers of epichlorohydrin and the like, epoxy-ethers of polyhydric alcohols (ethylene glycol, propylene glycols and butylene glycols, polyglycols, thiodiglycols, glycerine, pentaerythritol, sorbitol, polyvinyl alcohol, polyallyl alcohol and the like), epoxy-ethers of polyhydric phenols (resorcinol, hydroquinone, bis-(4-hydroxyphenyl)-methane, bis-(4-hydroxy-3-methylphenyl)-methane, bis-(4-hydroxy-3,5-dichlorophenyl)-methane, bis-(4-hydroxy-3,5-dibromophenyl)-methane, bis-(4-hydroxy-3,5-difluorophenyl)-methane, 1,1-bis-(4-hydroxyphenyl)-ethane, 2,2-bis-(4-hydroxyphenyl)-propane, 2,2-bis-(4-hydroxy-3-methylphenyl)-propane, 2,2-bis-(4-hydroxy-3-chlorophenyl)-propane, 2,2-bis-(4-hydroxy-3,5-dichlorophenyl)-propane, bis (4-hydroxyphenyl)-phenylmethane, bis-(4-hydroxyphenyl)-diphenylmethane, bis-(4-hydroxyphenyl)-4'-methylphenylmethane, 1,1-bis-(4-hydroxyphenyl)-2,2,2-trichloroethane, bis-(4-hydroxyphenyl)-(4-chlorophenyl)-methane, 1,1-bis-(4-hydroxyphenyl)-cyclohexane, bis-(4-hydroxyphenyl)-cyclohexylmethane, 4,4'-dihydroxydiphenyl, 2,2'-dihydroxydiphenyl, 4,4'-dihydroxydiphenylsulphone as well as their hydroxyethyl-ethers, phenol-formaldehyde condensation products, such as phenol-alcohols, phenol-aldehyde resins and the like), epoxides containing S and N (N,N-diglycidylaniline, or N,N'-dimethyldiglycidyl-4,4'-diaminodiphenylmethane), as well as epoxides which have been manufactured according to customary processes from poly-unsaturated carboxylic acids or mono-unsaturated carboxylic cid esters of unsaturated alcohols, glycidyl esters and polyglycidyl esters which can be obtained by polymerisation or copolymerisation from glycidyl esters of unsaturated acids or are obtainable from other acid compounds (cyanuric acid, diglycidylsulphide, cyclic trimethylenetrisulphone or their derivatives, and others).

Like the above mentioned pure epoxides, their mixtures, and also mixtures with monoepoxides, obtionally in the presence of solvents or plasticizers, can be reacted according to the present process. Thus, for example, the following monoepoxides can be used as mixtures with the abovementioned epoxide compounds: epoxidised unsaturated hydrocarbons (butylene oxide, cyclohexene oxide, styrene oxide and others), epoxides containing halogen, such as, for example, epichlorohydrin, epoxy-ethers of monohydric alcohols (methyl alcohol, ethyl alcohol, butyl alcohol, 2-ethylhexyl alcohol, dodecyl alcohol and others), epoxy-ethers of monohydric phenols (phenol, cresol and other phenols substituted in the o- or p-position), glycidyl esters of unsaturated carboxylic acids, epoxidised esters of unsaturated alcohols or unsaturated carboxylic acids, and the acetals of glycidaldehyde. Preferred polyhydric phenols employed are: resorcinol and various bisphenols which are obtained by condensation of phenol with aldehydes and ketones such as, for example formaldehyde, acetaldehyde, acetone, methyl ethyl ketone and others. Resins of this nature are described in U.S.A. Pat. Nos. 2,855,159 and 2,589,245. A particularly preferred epoxide resin is the reaction product of epichlorohydrin and 2,2-bis(p-hydroxyphenyl)-propane (= Bisphenol A), which epoxide resin has the following theoretical structural formula:

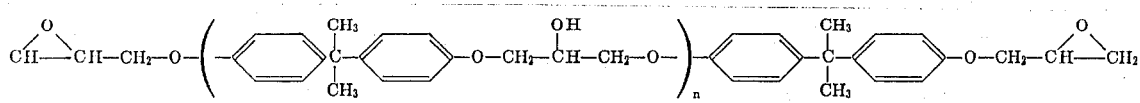

or the analogous compound based on Bisphenol F:

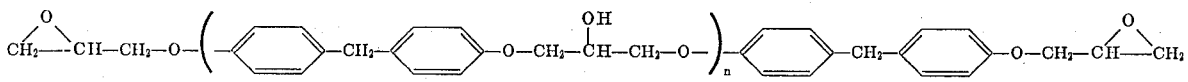

individually or mixed with Bisphenol A, with n denoting 0 or an integer up to 10. Normally, n is not greater than 2 or 3 and preferably it is 1 or less. The epoxide resin has an epoxide equivalent of 160 – 500.

The epoxide resin preferred for curing, which is in the form of an aqueous dispersion or is converted into the aqueous dispersion, is a Bisphenol A-epichlorohydrin epoxy resin, as described above, to which it is possible to add a diluent, such as a glycidyl ether of an aliphatic alcohol with 8 – 10 C atoms, for example butyl-glycidyl-ether, 2-ethylhexyl-glycidyl-ether, allyl-glycidyl-ether or other commercially available epoxy resin diluents. The diluent is normally present in an amount of 0 to 20 percent by weight, relative to the epoxide resin. Epoxide resins which are solid at room temperature can be dissolved by means of 5 to 25 percent by weight of customary solvents such as xylene or methyl isobutyl ketone.

The epoxide resins which can be cured with association compounds of the invention can contain further additives, such as, for example, wetting agents. Preferred wetting agents are the commercially available non-ionic wetting agents based on modified alkylphenol, such as, for example, alkylphenoxypoly-(ethyleneoxy-)ethanol, a condensate of nonylphenol and ethylene oxide, containing 9 – 10 mols of ethylene oxide per mol of nonylphenol and the like. The epoxide resins, which may optionally be treated with diluents or wetting agents, are generally introduced into water so that the dispersion preferably contains up to 50 percent by weight of water. If a combination of epoxide resin/curing agent according to the invention is used as a block filler or if pigments are present, the water content can even be 90 percent by weight.

If coloured coating mixtures are manufactured from epoxy resins and curing agents (association compounds) of the invention various additives can be added to the dispersion of epoxide resin and curing agent (association compounds) according to the invention. These include pigments such as titanium dioxide and iron oxide; fillers, such as asbestos, talc, mortar and other cementlike substances; pigment dispersing agents and other customary colouring and coating auxililaries.

The dispersion of epoxide resin-curing agent (association compounds) based on water can be used in any desired known manner. Suitable methods include the use of brushes, rollers, spraying, casting-coating, dipping, knife application, pressing, trowelling, electrodeposition, screen printing and the like.

The dispersion of epoxide resin-curing agent (association compound) can be used as a primer, filler, clear sealer, protective paint, coating, sealants, thin mortar, mortar and the like. It is used particularly appropriately in cases where corrosion resistance is desired. The dispersions can also be used with epoxide resin/thermoplastic mixtures, such as coal tar, vinyl polymers and the like. The dispersions can be used as binders for coal briquettes, conducting floor coverings and trowelling compositions, adhesives for timber, fabric, leather and metal and for various substrates to which coatings are applied, such as cementfloor coverings, walls, swimming pools, glass, glazed bricks and the like. Furthermore, the epoxide resin dispersion can be mixed with mortar or cement, in which case the water is used as an emulsion, in order to make up the cement. Conversely, the water in the cement mixture can be used as the solvent for the epoxide resin dispersion. Addition of the curing agent according to the invention permits homogeneous mixing of the cement and the epoxide resin-curing agent dispersion. In this way it is possible to obtain cement hardened with epoxide resin-curing agent dispersion.

The content of solids in the solvents is preferably as high as possible consistent with still permitting dispersion of the resins in the aqueous medium. In the case of most solutions, a total content of solids (including pigments) of 30 – 70 percent is generally satisfactory.

Epoxide resin dispersions which can be combined with asociation compounds according to the invention as curing agents are described, inter alia, in the following Patent Specifications: Austrian Patent specification 286,647 (= British Patent specification 1,244,424) and Japanese Patent specification 29,625/71, and in the Swiss Patent specification from the same Applicant Company and of the same date, carrying the file reference 11,104/72. The latter dispersions are employed preferentially.

The association compounds according to the invention, as curing agents together with epoxide resin dispersions according to Swiss Patent application 11,104/72, were converted as follows into a white-pigmented dispersion paint, which was applied to phosphatised iron sheets and asbestos-cement sheets. Dispersion 1 to 5:

| disper- | 2: 66 g | of the curing agent according to Ex. 3, |
| sion | | |
| do. | 3: 66 g | do. 4, |
| do. | 4: 66 g | do. 5, |
| do. | 5: 66 g | do. 6. |

The dispersions showed excellent stability over the course of the potlife, that is to say up to the beginning of the crosslinking reaction between the resin component and the curing agent component; which amounted to 2 – 8 hours. These aqueous dispersion paints were applied, in a layer thickness of approx. 100 $\mu$, onto phosphatised iron sheets and asbestoscement sheets. The technological results are summarised in Table 1 below.

MANUFACTURE OF FURTHER DISPERSIONS:

Aqueous dispersions were prepared from 100 g of an epoxide resin-emulsifier mixture consisting of 90 g of

|  | Dispersion | | | | |
| Test on asbestos-cement sheets | 1 | 2 | 3 | 4 | 5 |
| --- | --- | --- | --- | --- | --- |
| Pot life | 3 hrs. | 5 hrs | 1.5 hrs | 7.5 hrs | 5.5 hrs |
| Surface drying | 3 do. | 5.5 do. | 2 do. | 8 do. | 6 do. |
| Complete curing | approx. 24 do. | approx. 24 do. | approx. 18 do. | approx. 30 do. | approx. 24 do. |
| Film formation | ← perfect → | | | | |
| Film levelling | ← satisfactory → | | | | |
| Gloss | good | semi-glossy | good | eggshell gloss | semi-glossy |
| Test on phosphatised iron sheet Pendulum hardness after 1 week (according to König) | 105 secs | 90 secs | 110 secs | 88 secs | 97 secs |
| Erichsen deep-drawing value, DIN 53,156 | 4.0 mm | 3.5 mm | 2.5 mm | 4.5 mm | 3.5 mm |
| Whiteness (measured in the Leukometer according to Lange) | –40 | –55 | –43 | –50 | –47 |

72 g of an epoxide resin-emulsifier mixture, consisting of 66 g of a mixture of 88 percent by weight of an epoxide resin based on Bisphenol A and epichlorohydrin, having an epoxide equivalent of approx. 186 and a viscosity of 9,000 cP, measured at 25° C, and 12 percent by weight of 2-ethylhexyl-glycidyl-ether, were mixed warm with 6 g of an emulsifier mixture, consisting of 2.67 g of an addition product of 25 – 30 mols of ethylene oxide to 1 mol of abietic acid, 1 g of an addition product of 30 mols of ethylene oxide to 1 mol of p-nonyl-phenol, 1 g of an addition product of 10 mols of ethylene oxide to 1 mol of p-nonylphenol and 1.33 g of n-dodecyl alcohol (this mixture corresponds to the epoxide resin-emulsifier mixture from Example 7 of the Swiss Application of the same date 11,104/72.

This mixture was ground on a mill with 105 g of non-chalking titanium dioxide of the rutile type and 4 g of highly dispersed silica. 66 g of the curing agent according to Example 1 of this invention and 200 g of water were added with the aid of a stirrer.

Corresponding white-pigmented aqueous dispersion paints and coatings were manufactured using a mixture of 87.5 percent by weight of an epoxide resin based on bisphenol A and epichlorohydrin, having an epoxide equivalent of 185 and a viscosity of approx. 9,000 cP measured at 25° C, and 12.5% by weight of n-butyl-glycidyl-ether, 10 g of trimethylolpropane-glycidyl-ether having an epoxide equivalent of 152, a viscosity of 170 cP measured at 25° C and a total chlorine content of 7.4 percent by weight, 3 g of an addition product of 25 – 30 mols of ethylene oxide to 1 mol of abietic acid, 2 g of an addition product of 30 mols of ethylene oxide to 1 mol of p-nonylphenol, 2 g of an addition product of 8 mols of ethylene oxide to 1 mol of p-nonylphenol, 2 g of n-dodecyl alcohol (this mixture corresponds to the epoxide resin-emulsifier mixture from Example 5 of the Swiss Application of the same date 11,105/72) 225 g of water and 80 g of the curing agents of Examples 1 to 13. The dispersions showed excellent stability over the course of the processing time (that is to say up to the beginning of the crosslinking reaction between the resin component and curing agent component), which amounted to 1 – 10 hours. They are outstandingly suitable for coating concrete and plaster-rendered brickwork.

The technological results are summarised in Table 2 below.

| Dispersion with curing agent | | Pot life +) | | Surface drying | | Complete drying | | Erichsen deep-drawing value according to DIN 53,156 | Crosscut according to DIN 53,153 |
|---|---|---|---|---|---|---|---|---|---|
| Example | 1 | 3.5 | hrs. | 5 | hrs. | 24 | hrs. | 8.7 mm | 1 |
| do. | 2 | 3.5 | do. | 5.5 | do. | 24 | do. | 8.9 mm | 1 |
| do. | 3 | 5 hrs. | 20 min. | 6 | do. | 24 | do. | 8.3 mm | 1 |
| do. | 4 | 1 | hr. | 5 | do. | 20 | do. | 9.7 mm | 1 |
| do. | 5 | 8 | hrs. | 15 | do. | 30 | do. | 7.5 mm | 1 |
| do. | 6 | 5.5 | do. | 6 | do. | 24 | do. | 8.7 mm | 1 |
| do. | 7 | 8 | do. | 22 | do. | 30 | do. | 8.6 mm | 1 |
| do. | 8 | 4.5 | do. | 6.5 | do. | 24 | do. | 8.9 mm | 1 |
| do. | 9 | 4 | do. | 4.5 | do. | 24 | do. | 8.8 mm | 1 |
| do. | 10 | 3 | do. | 4 | do. | 24 | do. | 9.3 mm | 1 |
| do | 11 | 3 | do. | 4 | do. | 24 | do. | 8.9 mm | 1 |
| do. | 12 | 6 | do. | 7 | do. | 24 | do. | 8.9 mm | 1 |
| do. | 13 | 3.5 | do. | 5 | do. | 24 | do. | 8.7 mm | 1 |

The term "pot life" was used to denote the time which elapses until a dispersion of 50 g of the epoxide resin-emulsifier mixture, 50 g of water and 45 g of one of the curing agents according to the invention, from Examples 1 to 13, has gelled, or until the viscosity of the dispersion has risen so greatly that it can no longer be processed properly.

A mixture consisting of 80 g of fine-grained quartz sand (particle size 0.5 mm), 160 g of coarse-grained quartz sand, 80 g of cement, 11 g of an epoxide resin-emulsifier mixture corresponding to Example 2 of the Swiss Application of the same date No. 11,104/72 and consisting of 10.1 g of an epoxide resin from bisphenol A and epichlorohydrin, having an epoxide equivalent of 185 and a viscosity of 8,900 cP, measured at 25° C, 0.4 g of an addition product of 25 – 30 mols of ethylene oxide to 1 mol of abietic acid, 0.15 g of an addition product of 30 mols of ethylene oxide to 1 mol of p-nonylphenol, 0.15 g of an addition product of 4 mols of ethylene oxide to 1 mol of p-nonylphenol, 0.2 g of n-dodecyl alcohol and 0.5 g of 2-ethylhexylglycidylether, and 8.5 g of the association compound according to the invention used as curing agent, from Example 1 were homogeneously mixed in a mixing apparatus and stirred with 80 g of water to give a pasty consistency. This composition was applied by means of a knife to give an approximately 5 mm thick concrete floor covering which, after curing, showed excellent resistance to oil and water. The tensile strength, compressive strength and flexural strength of the concrete mixture were improved by 15 to 20 percent by adding the epoxide resin-curing agent emulsion.

What is claimed is:

1. Curing agent for aqueous epoxide resin dispersions, which is an association compound of
   1. a polyamidoamine-epoxide adduct of a stoichiometric excess of
      a. a polyamidoamine having an amine number of from about 80 to about 450 obtained from
         i. an alkylene polyamine having from 2 to 6 nitrogen atoms and wherein each alkylene radical has from 2 to 6 carbon atoms, either individually or as mixtures but when mixtures are used the ethylenediamine and propylenediamine contained therein amounts to at least one half of the polyalkylenepolyamines used; and
         ii. a polymeric fatty acid obtained by polymerization of drying or semi-drying oils containing mono-, di- or trimerized fatty acids containing 8 to 24 carbon atoms in the monomeric form, or the methyl, ethyl, propyl or butyl esters of such fatty acids, or an amide-forming derivative of such fatty acid with an aromatic vinyl compound, in a molar ratio of (i) to (ii) between 1:0.2 and 1:5, and
      b. from 5 to 35 percent, by weight, relative to the polyamidoamine (a) of an aliphatic epoxide having from three to six terminal epoxide groups per molecule, and
   2. from 5 to 30 percent, by weight, relative to the polyamidoamine (a) of a phenol/formaldehyde/polyamine condensation product wherein the polyamine has from 2 to 8 amino hydrogens inclusive, and the remainder of the polyamine is an aliphatic, araliphatic, cycloaliphatic or heterocyclic moiety.

2. Method for the production of an association compound of claim 1 which comprises reacting a mixture of
   1. a polyamidoamine-epoxide adduct of a stoichiometric excess of
      a. a polyamidoamine having an amine number of from about 80 to about 450 obtained from
         i. an alkylene polyamine having from 2 to 6 nitrogen atoms and wherein the alkylene radical has from 2 to 6 carbon atoms, either individually or as mixtures but when mixtures are used the ethylenediamine and propylenediamine contained therein amounts to at least one half of the polyalkylenepolyamines used; and
         ii. a polymeric fatty acid obtained by polymerization of drying or semi-drying oils containing mono-, di- or trimerized fatty acids containing 8 to 24 carbon atoms in the monomeric form, or the methyl, ethyl, propyl or butyl esters of such fatty acids, or an amide-forming derivative of such fatty acid with an aromatic vinyl compound, in a molar ratio of (i) to (ii) between 1:0.2 and 1:5, and
      b. from 5 to 35 percent, by weight, relative to the polyamidoamine (a) of an aliphatic epoxide having from three to six terminal epoxide groups per molecule, with
   2. from 5 to 30 percent, by weight, relative to the polyamidoamine (a) of a phenol/formaldehyde/polyamine condensation product wherein the polyamine has from 2 to 8 amino hydrogens inclusive, and the remainder of the polyamine is an aliphatic, araliphatic, cycloaliphatic or heterocyclic moiety, at a temperature of 50° to 180°C for from 1 to 3 hours, or at a temperature below 50°C until a viscosity increase of 10 to 50 percent is obtained.

3. Curing agent according to claim 1, characterized in that component 1a consists of a polyamidoamine of amine number between 80 and 450.

4. Curing agent according to claim 3 characterized in that the polyamidoamine 1a contains imidazoline groups additionally.

5. Curing agent according to claim 1, characterized in that component 1a is such a polyamidoamine which consists of a condensation product in which 0.5 to 1.5 mols alkylenepolyamine per equivalent of polymeric fatty acid is present in condensed form.

6. Curing agent according to one of the claim 1 characterized in that the component 1a consists of a polyamidoamine made of isomerized, mainly dimerized soya oil fatty acid, styrene and diethylenetriamine or triethylenetetramine, wherein the isomerized, mainly dimerized soya oil fatty acid and styrene are present in an acid to styrenee molar ratio of 2 : 1.

7. Curing agent according to claim 1, characterized in that the component 1a consists of a polyamidoamine made of dimerized fatty acids, which are isolated from isomerized and polymerized tall oil fatty acids, and diethylenetriamine.

8. Curing agent according to one of the claim 1, characterized in that component 1b consists of trimethylolpropaneglycidylether, glycerineglycidylether, pentaerythritolglycidylether, glycidylether of an oxypropylated pentaerythritol, sorbitolglycidylether or a glycidylether of an oxpropylated sorbitol.

9. Method for manufacturing of a curable film-forming dispersion which can be diluted with water which comprises
A. preparing a mixture comprising (i) about 88 percent by weight of an epoxide resin based on Bisphenol A and epichlorohydrin, having an epoxide equivalent of about 186 and a viscosity of about 9000 centipoise, measured at 25°C and (ii) about 12 percent by weight of 2-ethyl hexyl-glycidylether,
B. mixing about 66 parts by weight of the step (A) mixture with about 6 parts by weight of an emulsifier mixture comprising about 2.67 parts by weight of an addition product of 25 to 30 mols of ethylene oxide and 1 mole of abietic acid, 1 part by weight of an addition product of 30 mols of ethylene oxide to 1 mol of p-nonylphenol, about 1 part by weight of an addition product of 10 mols of ethylene oxide to 1 mol of p-nonylphenol and about 1.33 part by weight of n-dodecyl alcohol,
C. grinding the mixture from step (B) with about 105 parts by weight of titanium dioxide of the rutile type, and about 4 parts by weight of highly dispersed silica, and then
D. adding to the mixture from step (C) about 66 parts by weight of the curing agent described in claim 10 and about 200 parts by weight of water, while stirring.

10. Method according to claim 9 wherein the curing agent added in step (D) comprises an association compound of
1. a polyamidoamine-epoxide adduct of
   a. about 183 parts by weight of polyamidoamine made by reacting (i) sufficient diethylenetriamine with (ii) a copolymer of 2 molar proportions of isomerized soya oil fatty acid methyl ester and one molar proportion of styrene, having a saponification number of about 190, at about 190°C until the resulting polyamidoamine has a viscosity at 25°C of about 1,950 centipoise, an amine number of about 278 and an amine hydrogen equivalent weight of about 110, and
   b. about 26.3 parts by weight of trimethylolpropaneglycidyl-ether, and
2. about 26.5 parts by weight of a phenol/formaldehyde/polyamine condensation product of about 188 parts by weight of phenol, about 96 parts by weight of 44 percent by weight aqueous formaldehyde solution, and about 272 parts by weight of xylylenediamine.

* * * * *

UNITED STATES PATENT OFFICE
CERTIFICATE OF CORRECTION

Patent No. 3,870,666  Dated March 11, 1975

Inventor(s) Wilhelm Becker

It is certified that error appears in the above-identified patent and that said Letters Patent are hereby corrected as shown below:

[73] Assignee: HOECHST AKTIENGESELLSCHAFT, Frankfurt, Germany

| | | |
|---|---|---|
| Col. 2, line 53 | "alikphatic" | -- aliphatic -- |
| Col. 5, line 48 | "Polyamidoaamine" | -- Polyamidoamine -- |
| Col. 6, line 49 | "polyamaines" | -- polyamines -- |
| Col. 13, line 6 | "cid" | -- acid -- |
| Col. 19, line 33, (Claim 8) | "oxpropylated" | -- oxypropylated -- |

*Signed and Sealed this*

*ninth* Day of *September 1975*

[SEAL]

Attest:

RUTH C. MASON  
*Attesting Officer*

C. MARSHALL DANN  
*Commissioner of Patents and Trademarks*